Nov. 10, 1953                E. H. HEYER                2,659,038
                     AUTOMATIC ILLUMINATION SYSTEM
Filed Aug. 15, 1949                                  4 Sheets-Sheet 1

INVENTOR.
ERIC H. HEYER,
BY
ATTORNEY.

Nov. 10, 1953  E. H. HEYER  2,659,038
AUTOMATIC ILLUMINATION SYSTEM
Filed Aug. 15, 1949  4 Sheets-Sheet 2
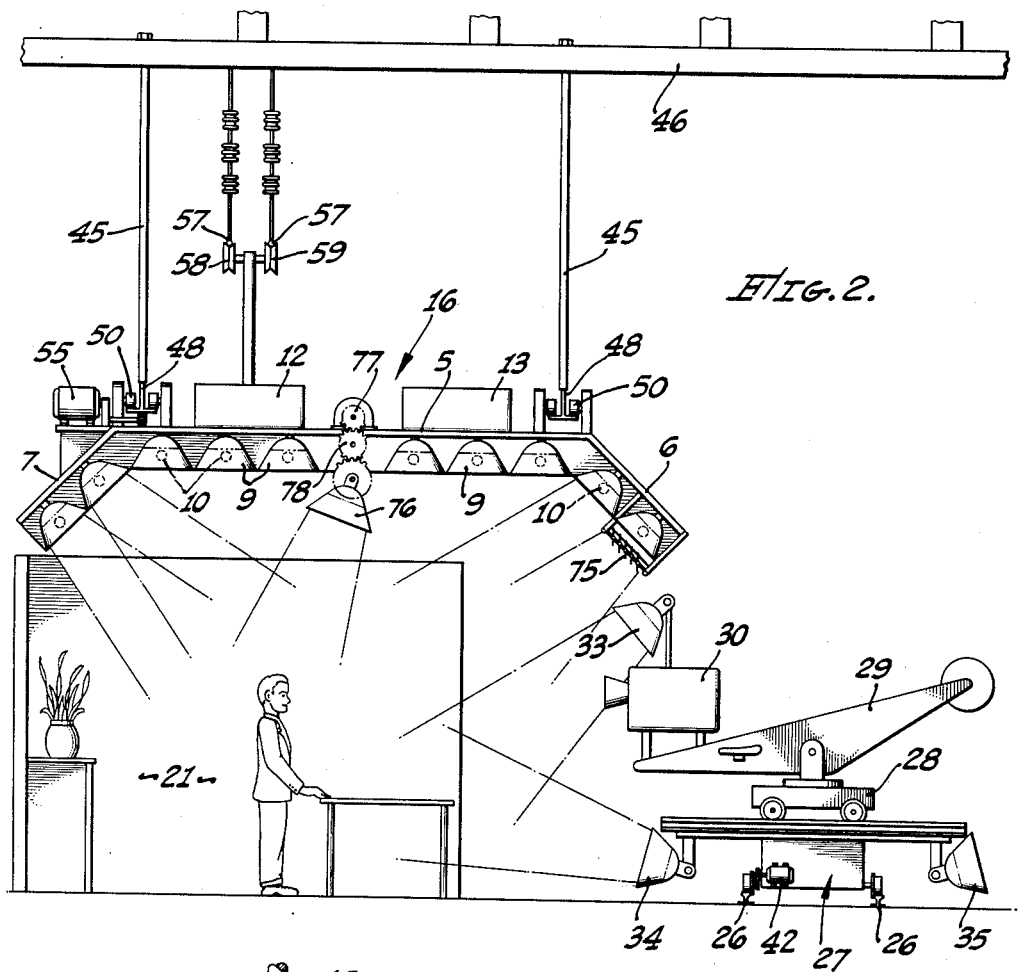
FIG. 2.
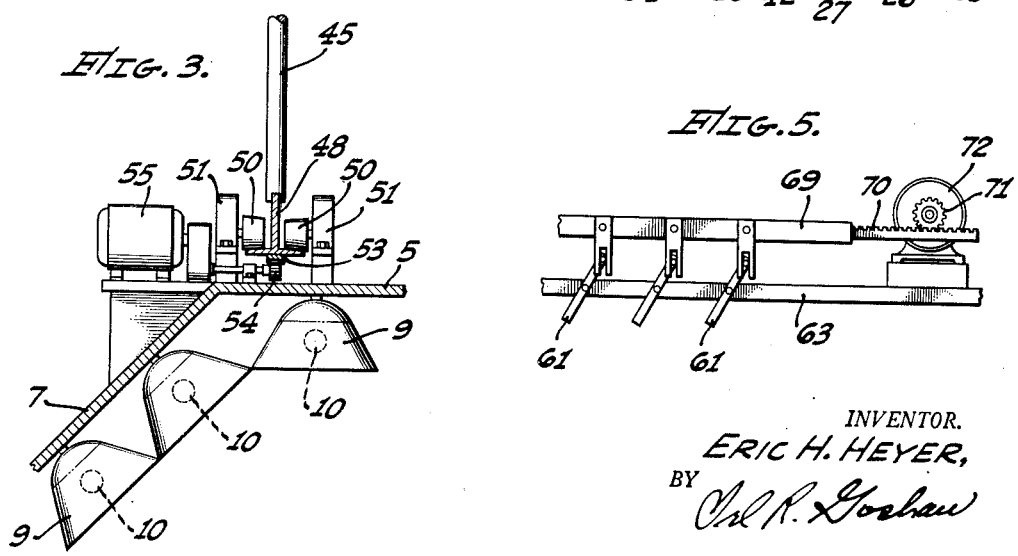
FIG. 3.
FIG. 5.
INVENTOR.
ERIC H. HEYER,
BY
ATTORNEY.

INVENTOR.
ERIC H. HEYER,
BY
ATTORNEY.

Nov. 10, 1953     E. H. HEYER     2,659,038
AUTOMATIC ILLUMINATION SYSTEM

Filed Aug. 15, 1949     4 Sheets-Sheet 4

INVENTOR.
ERIC H. HEYER,
BY
ATTORNEY.

Patented Nov. 10, 1953

2,659,038

UNITED STATES PATENT OFFICE 2,659,038

AUTOMATIC ILLUMINATION SYSTEM

Eric H. Heyer, Los Angeles, Calif.

Application August 15, 1949, Serial No. 110,344

4 Claims. (Cl. 315—316)

This invention relates to the production of motion pictures, and particularly to the automatic control of the illumination of one or a plurality of stages or sets.

In the production of motion pictures, each stage or set, in which a scene, with or without action, is to be photographed, has a plurality of lamps arranged on platforms above and around the set to provide the desired illumination, while a lamp to provide the key light is generally mounted near the camera, this lamp providing the proper illumination on the point of interest in the scene. Considerable time is consumed in arranging the platforms, arranging the lamps and their controls, and adjusting the lights before and during rehearsals. The present invention is directed to a system which provides for pre-arranging the illumination of a multiple set stage, not only with general illumination, but with key lighting, and for automatically recreating the previous illumination at a later time when the set is to be photographed.

The invention utilizes a blanket of lamps above the set, certain of which are turned on and adjusted in intensity in accordance with the particular action to take place in that set. When this blanket illumination and the key illumination have been predetermined, a cue sheet in the form of templet is automatically made for that particular set. The blanket of lamps is then moved to another set, and again, certain lights are energized and adjusted in accordance with the particular action on that set. After this determination of the lighting, another templet it made to record the illumination desired. This may be done for a large number of sets, over which the blanket of lights is transportable, a templet being made for each set.

Now, when the sets are to be photographed, it is only necessary for the operator to take the proper templet arranged for that set and place it over the switch controls, and the pre-arranged lighting effect will be duplicated immediately. The scene may then be photographed. The lamp blanket will then be moved to the next set, and the templet prepared for that set will be applied to the switch controls, and that set will be properly illuminated. Thus, each set may be very rapidly illuminated, saving the time of the actors and other crew members and permitting a greater number of scenes to be photographed in a given length of time than heretofore.

The principal object of the invention, therefore, is to facilitate the production of motion pictures.

Another object of the invention is to provide an improved method of and system for lighting sets to be photographed.

A further object of the invention is to provide an automatic lighting system which may be pre-arranged and a templet made therefor to duplicate the lighting at a later time when the scene is photographed.

A still further object of the invention is to provide an improved method of and system for rapidly illuminating a plurality of scenes in a short time period.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 2 is an enlarged, sectional view of one of the units of the invention in operation.

Fig. 3 is a detailed view showing the rail system of the invention.

Figs. 4 and 5 are detailed views of the light diffusing screens of the invention.

Figure 1:
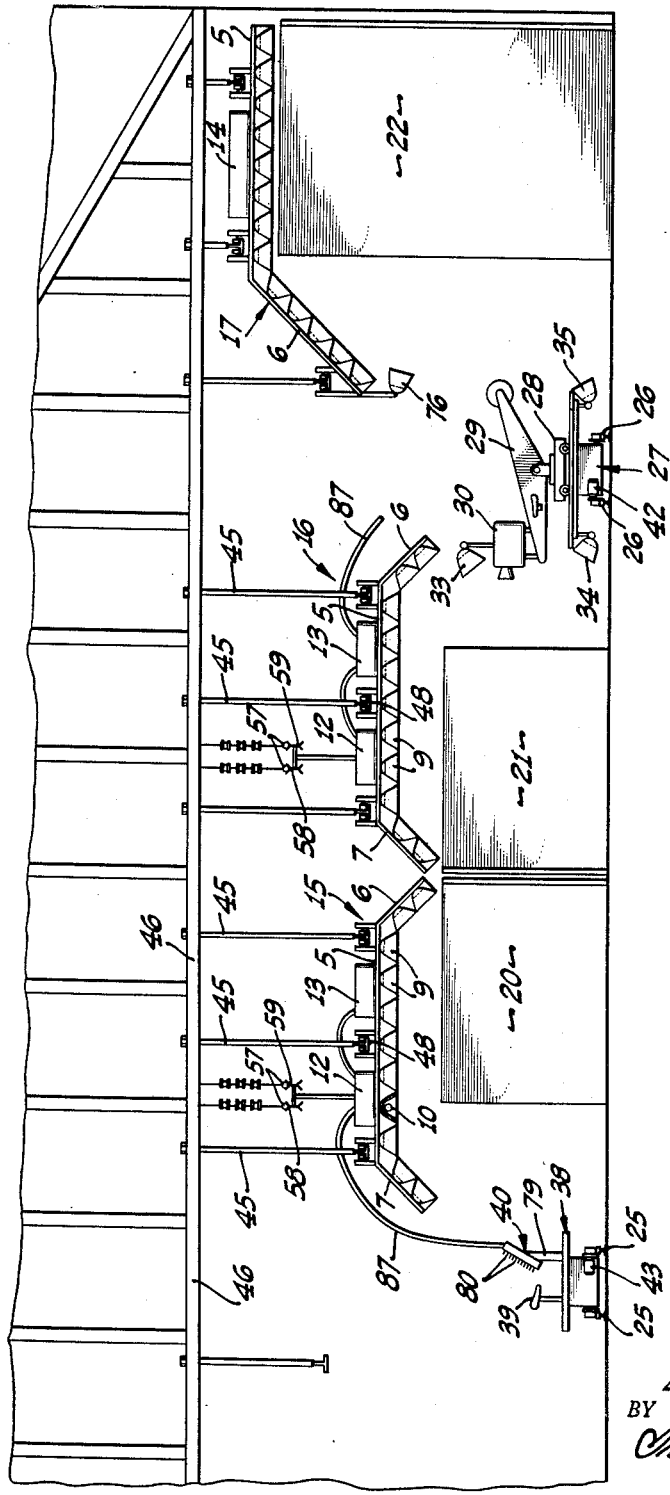
Fig. 1 is an elevational view showing the invention on a stage.

Referring now to the drawings, in which the same numerals identify like elements, rectangularly shaped horizontal panel frames 5 have side panels 6 and 7 positioned at approximately forty-five degrees to panels 5, similar panels being provided at the other ends of the horizontal panel frames 5. Mounted on the horizontal and side panels are light reflectors, as shown at 9, in which are lamps 10 for illuminating a set. Mounted on top of each lighting panel are a plurality of the usual types of power relays, such as shown diagrammatically at 12 and 13, these relays simply permitting control of large currents to the lamps 10 by smaller currents to the relay windings, as is well-known in the art, and shown at 90 and 93 in Fig. 9.

As shown in Fig. 1, three such units are shown generally at 15, 16, and 17, the units 15 and 16 extending over sets, such as shown at 20 and 21 at the center of the stage, while unit 17 extends over sets arranged along the side walls of the stage, as shown at 22. These sets are constructed and positioned in accordance with the disclosure and claims in my co-pending application, Ser. No. 110,343, filed August 15, 1949, wherein a continuous track has straightaway rail sections 25 and 26. The rails carry a camera car 27, on which is mounted a transversely movable carriage 28 carrying a boom 29, on which is mounted a motion picture or television camera 30. The car may also carry key lighting units, such as shown at 33, 34, and 35, which may be manually controlled to vary the lighting on the key subject of the action.

Figure 6:
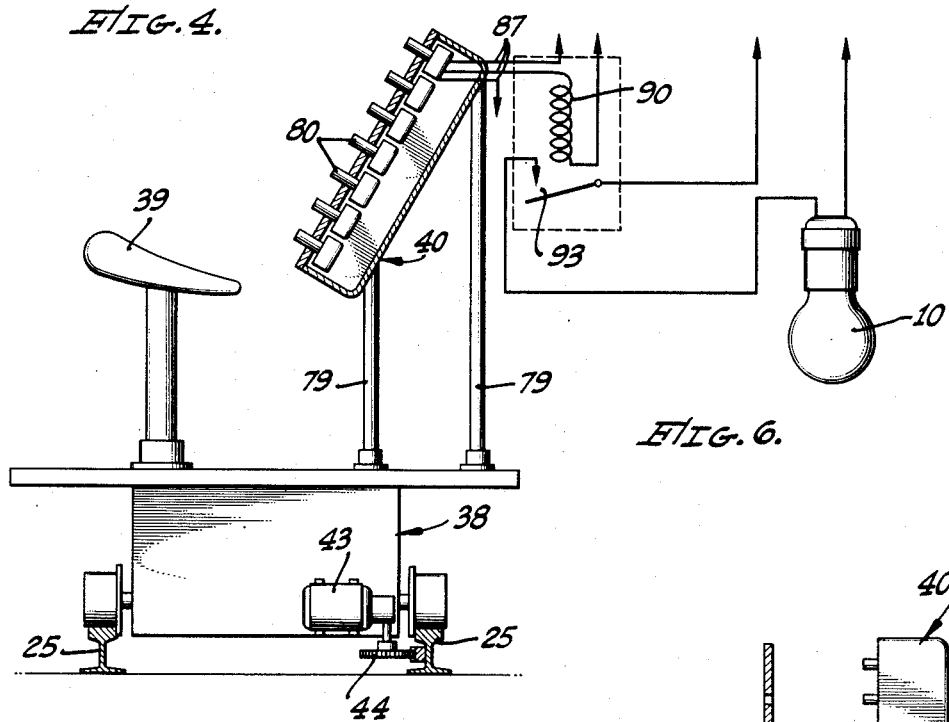
Fig. 6 is an enlarged view of the control panel of the invention.
Figure 7:
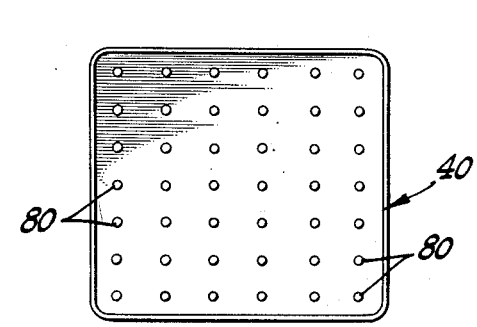
Figs. 7 and 8 are detailed views of a switch control panel and templet.
Figure 8:
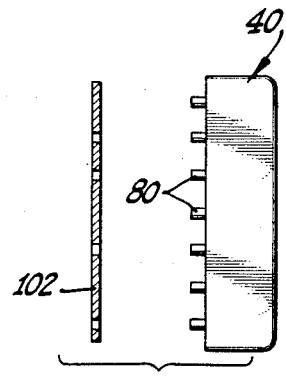

Also mounted on the rails, is a control car 38 having a seat 39 and an automatic switch control panel 40 thereon for the lamps in the units 15, 16, and 17. Although the switch panel is shown mounted on a separate car 38 on track 25, it would normally be adjacent camera car 27 or it could be mounted on the camera car itself. The camera car is moved along the rails by a motor 42 geared to the axle of the driving wheels or geared to a rack fastened to one of the rails, as shown at 44 in Fig. 6, while the control car may be similarly driven by a motor 43, although it is to be understood that the camera and control cars can be automatically controlled with respect to their stopping positions by the control mechanism disclosed and claimed in co-pending application, Ser. No. 115,844, filed September 15, 1949.

The units 15, 16, and 17 are mounted from rod supports, such as shown at 45, having one end attached to the cross beams 46 of the stage and the other ends terminating in T-type rails 48. The units are attached to the rails by wheels, such as shown at 50, mounted on axles attached to bosses 51 extending from the horizontal frame panels 5. As shown in detail in Fig. 3, the under portion of the rails 48 carries a rack 53 in mesh with a pinion 54 on the shaft of a drive motor 55. Thus, to move the units 15, 16, and 17 along the rails 48, the motors 55 are energized and the units will travel from set to set. Power is provided to the relays 12, 13, and 14 by a trolley system, such as shown in Figs. 1 and 2, wherein the trolley wires 57 are in contact with a pair of trolley wheels 58 and 59, which are moved along with the lamp units. Thus, the units may be considered as lamp or lighting blankets which are movable over any particular set to be illuminated.

Figure 4:
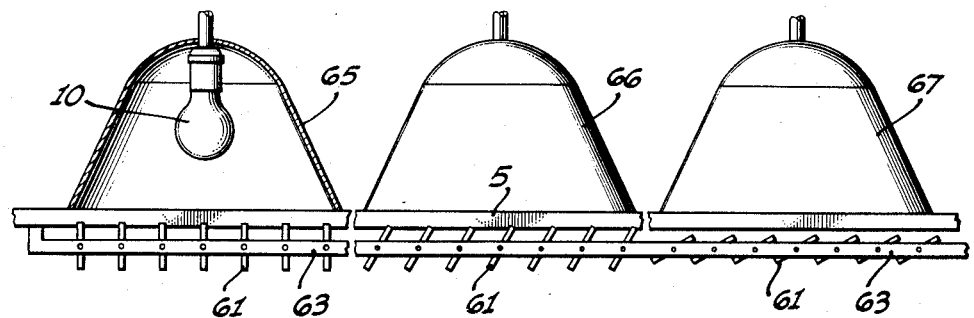

Although, as will be explained hereinafter, different lamps in each bracket may be energized, it may be desirable, in some instances, to diffuse the light or reduce it from certain energized lamps. This may be provided, as shown in Figs. 2, 4, and 5, by a plurality of rotatable shutters or vanes 61 rotatably mounted on the brackets 63 in front of certain lamps, such as 65, 66, and 67. The shutters may be opaque or of a diffusing glass, and, as shown in Fig. 5, the shutters or vanes are connected to a rack bar 69 having a rack 70 in mesh with a pinion gear 71 of a motor 72. Thus, longitudinal movement of the rack bar 69 will open and close the shutters 61, and the motor may be controlled for forward and reverse action from a remote point, such as the control car. Although several shutters are shown in Fig. 4 in front of three lamps, Fig. 2 shows a single shutter unit 75 which may be mounted in front of only a single lamp.

To further control the light, as shown in Fig. 2, a key lamp such as shown at 76, may be rotated by means of a motor 77 geared by gears 78 to the lamp 76. Thus, the action on a set may be properly illuminated by the energization of certain lamps 10, which are controllable by the shutters 61, as shown at 75, and by the key lights at 76 or 34. Since this illuminating system has, for its major purpose, the provision of certain pre-illumination, in accordance with the action to be photographed at a subsequent time, and the repetition of such illumination, while providing flexibility thereof, the automatic control system which provides these results will now be described.

Figure 9:
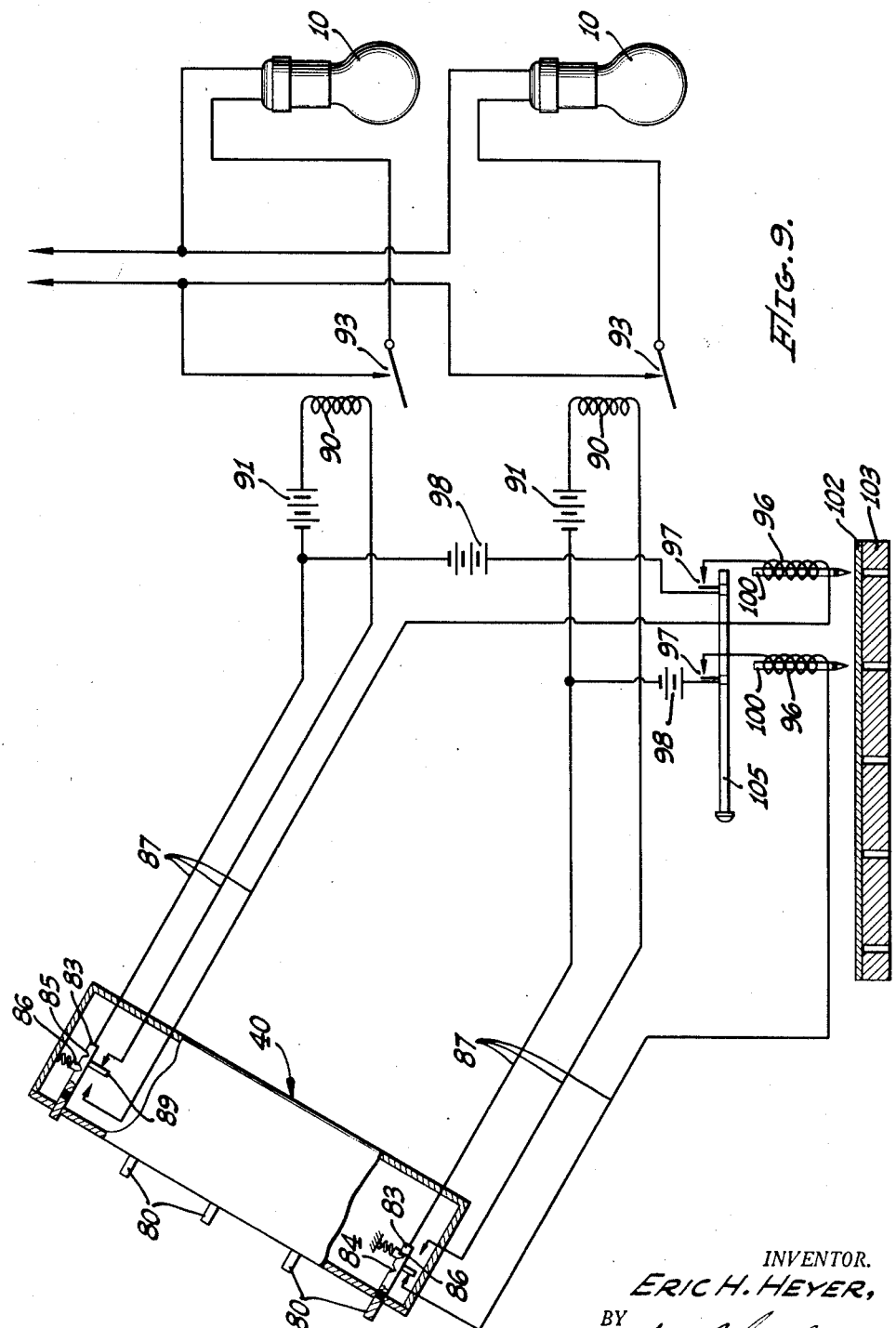
Fig. 9 is a combination schematic and diagrammatic view of the automatic control and templet cutting circuits of the invention.

Referring now to Figs. 5, 6, 7, and 8, the automatic control switchboard 40 is mounted in any suitable manner, such as on standards 79, and has thereon coordinately arranged pin type switch buttons 80, which are connected to the lamps and energy supplies over the necessary cables. (See Fig. 7.) As shown in Fig. 9, these switch buttons have current conducting portions 83 with notches 84 and 85 therein, in which latches 86 are adapted to be inserted according to the positioning of the switches. When a switch is in the position shown in the upper portion of the panel 40 in Fig. 9, a switch contact element 89 makes its lower contact, and when a switch is in the position shown in the lower portion of panel 40, the element 89 makes its upper contact. The lower contact of each pin energizes relay windings 90 from suitable power sources, such as at 91, which, in turn, closes contacts 93. Closed contacts 93 energize lamps 10 from a lamp energizing supply over the contacts 93, as shown in Fig. 9.

Now, if the switches 80 are not pushed down, but are as shown by the switch in the lower portion of panel 40, the solenoid coils 96 are energized over contacts 97 when the latter are closed to connect suitable energy supplies 98 to the coils 96. The solenoid coils 96 have armatures 100 therein, which, when they are energized, are actuated to punch holes in a templet plate 102 mounted on a die 103 and adjacent panel 40 in Fig. 7. Each of the switches 80 controls the energization of one or more lamps 10 over the control cables, such as shown at 87. After the desired number of lamps have been energized to provide a certain desired illumination of a certain set, the coils 96 are energized by the operation of a plunger 105, which will simultaneously close all contacts 97. However, only those coils 96 will be energized which are connected to the switch elements 80 which have not been actuated to energize lamps, so that the latches 86 are in the lower notches 85 of the switch portions 83. Thus, the templet 102 will have holes punched therein at the positions of non-actuated switches.

To operate the system, a particular lamp blanket 15, 16, or 17 is moved to a position above a set. Various pin switches 80 are then operated to adjust the lamps to provide the illumination decided upon for the action on the set to be photographed. After this is accomplished, the templet plate 102 is placed on the die 103 and the plunger 105 is actuated. This action energizes the solenoid coils connected to the switches 80, which have not been used to energize lamps, and holes are punched in the templet plate 102 accordingly. This plate may then be numbered and given the set number or other information, so that it may be properly identified at a later time.

At this later time, the templet plate is placed over the control switchboard 80 (see Fig. 8) and pressed downwardly on the switches, which have all been positioned as shown in the lower portion of the panel in Fig. 9. The result is that all the previously actuated switches 80 are moved by the templet and the contact elements 89 make their lower contacts. The other pin switches will pass through the holes previously punched by solenoids 96. In this manner, the set, at the time of photographing, will be illuminated in exactly the same manner as previously arranged. Since the operator who originally illuminated the set may not be the same as the operator who later illuminates the set for photographing, the later operator may vary the illumination to some extent by remotely controlling the shutters or vanes 61, or the key lamps, such as shown at 33, 34, 35, and 76. However, the general illumination will be correct, any slight variations therein being made by the later photographing operator, such as the director or cameraman, who may feel that the slight change is desirable.

There is thus provided a system whereby the illumination for each set to be photographed at a subsequent time may be previously arranged and then exactly duplicated at a later time. In this manner, a great deal of time of highly paid actors, directors, and other technicians is saved, since it is not necessary to wait for the illumination engineers to arrange the illumination for the set. Any slight variations at the time of photography may be quickly made by remote control from the camera or control car. With this system, many more motion picure sequences can be photographed in a given length of time than are now possible with the present methods and systems of illumination.

I claim:

1. In an automatic set lighting system, a control circuit for recording a certain number of energized lamps and for reselecting said lamps at a subsequent time, comprising a plurality of lamps, certain of which are to be energized, a panel having a plurality of movable switches therein, one switch being provided for each of said lamps, a pair of contacts for each of said switches, said switches making one contact when in one position and another contact when in a second position, a circuit from one of each of said pairs of contacts for energizing its respective lamp upon making of said contact by said switch, solenoids having movable cores and corresponding in number to said switches and said lamps, energizing means for said solenoids, a circuit from each of the other of said pair of contacts for connecting said energizing means to a respective solenoid when said other contact is made by said switch, a switch having a fixed contact interposed in each of said last mentioned circuits between each of said solenoids and said energy source, a common movable member for said last mentioned switch, and multiple contacts mounted on said common movable member for simultaneously closing all of said fixed contacts, operation of said common movable member energizing the solenoids connected to said first mentioned switches, said solenoids having movable cores for producing a record of the solenoids energized.

2. An automatic set lighting system in accordance with claim 1, in which a templet is positioned adjacent the ends of said movable cores, energization of the solenoids moving their respective cores in contact with said templet.

3. A system for producing a record of a lighting arrangement, comprising a plurality of lamps, a corresponding plurality of solenoids having movable cores, a power supply, an individual two-position switch for controlling the energization of each lamp, and for controlling the energization of said solenoids, and a pair of circuits from each of said switches, one of said circuits from each of said switches connecting said power supply to a respective lamp controlled by said switches when said switches are in one position, and the other of said circuits connecting said power supply to a respective solenoid controlled by said switches when said switches are in their other positions, a switch for simultaneously energizing the solenoids connected through the first mentioned switches in their second mentioned positions, the cores of said energized solenoids moving to produce a record of their movement and of the lamps energized and deenergized.

4. A set record lighting producing system in accordance with claim 3, in which a templet is provided adjacent the ends of said cores, the movement of said cores marking said templet.

ERIC H. HEYER.

References Cited in the file of this patent

UNITED STATES PATENTS

| Number | Name | Date |
|---|---|---|
| 455,440 | Lannert | July 7, 1891 |
| 520,223 | Schneider | May 22, 1894 |
| 758,589 | Faltermayer | Apr. 26, 1904 |
| 1,243,308 | Launbranck | Oct. 16, 1917 |
| 1,331,151 | Hopkins | Feb. 17, 1920 |
| 1,407,806 | Richards | Feb. 28, 1922 |
| 1,451,900 | Diegel | Apr. 17, 1923 |
| 1,627,993 | Pedersen | May 10, 1927 |
| 1,799,789 | Gwynne | Apr. 7, 1931 |
| 1,923,741 | Murdock et al. | Aug. 22, 1933 |
| 1,953,072 | Casper | Apr. 3, 1934 |
| 1,985,044 | Lyle | Dec. 18, 1934 |
| 2,070,334 | Garber | Feb. 9, 1937 |
| 2,078,677 | Long | Apr. 27, 1937 |
| 2,322,602 | Terry | June 22, 1943 |
| 2,351,405 | Cooper | June 13, 1944 |
| 2,392,890 | Vincent et al. | Jan. 15, 1946 |